United States Patent
Huberman et al.

(10) Patent No.: US 11,218,839 B1
(45) Date of Patent: Jan. 4, 2022

(54) METHOD AND SYSTEM FOR ZONE-BASED LOCALIZATION OF MOBILE DEVICES

(71) Applicants: Sean Huberman, Guelph (CA); Joshua Karon, Toronto (CA); Vera Miller, Toronto (CA)

(72) Inventors: Sean Huberman, Guelph (CA); Joshua Karon, Toronto (CA); Vera Miller, Toronto (CA)

(73) Assignee: MAPSTED CORP., Mississauga (CA)

( * ) Notice: Subject to any disclaimer, the term of this patent is extended or adjusted under 35 U.S.C. 154(b) by 0 days.

(21) Appl. No.: 17/062,701

(22) Filed: Oct. 5, 2020

(51) Int. Cl.
*H04W 4/02* (2018.01)
*G01S 5/02* (2010.01)
*G01D 21/02* (2006.01)
*H04W 4/33* (2018.01)

(52) U.S. Cl.
CPC ............ *H04W 4/027* (2013.01); *G01D 21/02* (2013.01); *G01S 5/0252* (2013.01); *H04W 4/33* (2018.02)

(58) Field of Classification Search
CPC ........ H04W 4/027; H04W 4/33; G01D 21/02; G01S 5/0252
See application file for complete search history.

(56) References Cited

U.S. PATENT DOCUMENTS

| | | | |
|---|---|---|---|
| 5,045,860 A * | 9/1991 | Hodson | G01S 5/0009 342/451 |
| 6,539,327 B1 | 3/2003 | Dassot et al. | |
| 8,305,264 B1 * | 11/2012 | Jones | G01S 19/17 342/357.25 |
| 9,170,112 B2 | 10/2015 | Mirov et al. | |
| 9,557,178 B2 | 1/2017 | Ghose et al. | |
| 9,692,839 B2 * | 6/2017 | Davis | G16H 40/67 |
| 10,397,753 B2 * | 8/2019 | Arora | H04W 4/33 |
| 2009/0043504 A1 | 2/2009 | Bandyopadhyay et al. | |
| 2009/0189810 A1 * | 7/2009 | Murray | G01S 19/48 342/357.31 |
| 2010/0007552 A1 * | 1/2010 | Oda | G01S 19/48 342/357.43 |
| 2012/0249368 A1 * | 10/2012 | Youssef | G01S 19/48 342/357.31 |
| 2013/0150076 A1 | 6/2013 | Kim et al. | |
| 2013/0162481 A1 | 6/2013 | Parvizi et al. | |
| 2014/0180627 A1 * | 6/2014 | Naguib | G01C 21/08 702/150 |
| 2014/0253371 A1 * | 9/2014 | Chen | G01S 19/258 342/357.29 |
| 2015/0018018 A1 | 1/2015 | Shen et al. | |
| 2015/0189618 A1 * | 7/2015 | Park | G01S 19/48 455/456.5 |
| 2016/0011022 A1 | 1/2016 | Zheng et al. | |
| 2016/0379074 A1 | 12/2016 | Nielsen et al. | |

(Continued)

*Primary Examiner* — Ernest G Tacsik (57) ABSTRACT

A method and a device for zone-based localization of mobile devices are described. In an example, a zone from amongst a plurality of zones of an indoor space in which a mobile device is present is identified. The identification of the can be based on instantaneous localization information obtained from the mobile device. Further, a localization criterion to be employed for localizing the mobile device is determined based on the identified zone. The localization criterion may be indicative of a selectivity in use of sensor data for localizing the mobile device. Subsequently, the mobile device is localized in the indoor space, based on the localization criterion.

18 Claims, 4 Drawing Sheets

(56) References Cited

U.S. PATENT DOCUMENTS

| | | |
|---|---|---|
| 2017/0113664 A1* | 4/2017 | Nix .......................... B60T 7/12 |
| 2017/0265041 A1* | 9/2017 | Mahasenan ........... H04W 64/00 |
| 2018/0274931 A1* | 9/2018 | Noethlings ............ G01C 21/08 |
| 2018/0275285 A1* | 9/2018 | Jun ......................... G01S 19/48 |
| 2018/0356475 A1 | 12/2018 | Eitel et al. |
| 2019/0004023 A1* | 1/2019 | Kelly ....................... G01D 3/08 |
| 2021/0014642 A1* | 1/2021 | Taira ..................... H04W 4/027 |
| 2021/0095968 A1* | 4/2021 | Karon ................. G01C 21/206 |

* cited by examiner

IDENTIFY A ZONE OF AN INDOOR SPACE A MOBILE DEVICE IS PRESENT IN, THE INDOOR SPACE BEING DIVIDED INTO A PLURALITY OF ZONES, WHEREIN THE IDENTIFYING IS BASED ON INSTANTANEOUS LOCALIZATION INFORMATION OBTAINED FROM THE MOBILE DEVICE 310

↓

DETERMINE A LOCALIZATION CRITERIA TO BE EMPLOYED FOR LOCALIZING THE MOBILE DEVICE, BASED ON THE IDENTIFIED ZONE, WHEREIN THE LOCALIZATION CRITERION IS INDICATIVE OF A SELECTIVITY IN USE OF SENSOR DATA FOR LOCALIZING THE MOBILE DEVICE
320

↓

LOCALIZE THE MOBILE DEVICE IN THE INDOOR SPACE, BASED ON THE LOCALIZATION CRITERION
330

```
┌─────────────────────────────────────────────────────────────────┐
│ SEGREGATE AN INDOOR SPACE INTO A PLURALITY OF ZONES, EACH OF THE │
│ PLURALITY OF ZONES BEING ASSOCIATED WITH A SET OF ENVIRONMENTAL  │
│ CONDITIONS INFLUENCING BEHAVIOR OF SENSOR DATA IN EACH OF THE    │
│                  PLURALITY OF ZONES 410                          │
└─────────────────────────────────────────────────────────────────┘
                                  │
                                  ▼
┌─────────────────────────────────────────────────────────────────┐
│ ASSOCIATEE A LOCALIZATION CRITERION WITH EACH OF THE PLURALITY OF│
│   ZONES, WHEREIN THE LOCALIZATION CRITERION IS INDICATIVE OF A   │
│  SELECTIVITY IN USE OF THE SENSOR DATA FOR LOCALIZING THE MOBILE │
│                         DEVICE 420                               │
└─────────────────────────────────────────────────────────────────┘
```

FIG. 4

METHOD AND SYSTEM FOR ZONE-BASED LOCALIZATION OF MOBILE DEVICES

TECHNICAL FIELD

The disclosure herein relates to the field of mobile device indoor navigation and localization.

BACKGROUND

Users of mobile devices increasingly use and depend upon indoor positioning and navigation applications and features. Particularly, Indoor positioning and navigation of a mobile device carried or worn by a user can be difficult to achieve using satellite-based navigation systems because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other mobile computing devices, in conjunction with acquired wireless communication signal data to localize the mobile device. Thus, effectiveness of the indoor navigation and positioning solution is directly dependent on the quality of data, sensor or signal, and the manner of utilization of data for localization.

DETAILED DESCRIPTION

Among other benefits and technical effects, embodiments provided herein provide for efficiently and accurately determining locations of mobile devices in an indoor space by performing the localization by, first, segregation of the indoor space into various zones and, then, by using predetermined behavioral patterns of sensor data in the various zones as the basis to localize the mobile device in one of the various zones. The present subject matter, basically, identifies the sensor data that is reliable for a given zone of the indoor space, and when the mobile device is determined to be in that zone, the reliable sensor data is primarily considered for localizing the mobile device as compared to less reliable ones. Accordingly, the localization of the mobile device with a zone-based localization technique can reap accurate position estimation as well as efficient use of the resources, in term of computational resources as well as time.

Generally, sensor data, such as that from inertial sensors and/or signal sensors, may be used for location estimation in an indoor space. Usually, for localization of a mobile device in the indoor space, combination of the sensor data is used in combination with various positioning techniques. For example, a trajectory of the mobile device can be estimated using the positioning techniques, which may use the sensor data. In such location estimation or positioning techniques, the data sensors may not always provide an accurate and reliable mode of estimation, mostly owing to the fact that the behavior of each type of sensor may vary in the indoor space depending on various factors, including environmental factors associated with the indoor space. In other words, owing to the nature of the sensor or the manner in which the sensor data is generated, not all types of sensors may behave in a similar manner at all locations in the indoor space. For example, given the nature of magnetic field signals, magnetic field sensors may not be useful in locations where there are a number of other magnetic fields which can influence the magnetic field signals from the magnetic field sensors. In another example, received signal strength as data for use for localization may not be useful in certain locations owing to its attenuation characteristics.

The problem is further convoluted when the indoor space contains areas of contrasting environmental characteristics. For example, the indoor space may be made of long narrow hallways or pathways as well wide-open spaces, and may also include locations which have different elevations of the same location at different floors. In such a case, positioning techniques may be unable to accurately localize the mobile device. At the same time, the inaccurate localization may still involve consumption of substantial computational resources and time, given the enormous amount of sensor data from all the various sensors, inertial as well as signal, internal to the mobile device as well as external. Therefore, such expenditure of processing resources and time may occur to still arrive at an inadequate and futile exercise of localization of the mobile device. In other words, notwithstanding the lack of accuracy, the positioning techniques, may suffer from high latency as well as high computational cost.

Examples of the present subject matter are described herein which seek to address, inter alia, the above outlined deficiencies. According to an aspect, the present subject matter discloses that optimal indoor localization, for example, accurate as well as computationally light, is achieved when positioning techniques are curated to the match the characteristics of the location of the indoor space in which the localization is to be performed. In an example, the indoor space can be a shopping mall, an airport, a warehouse, a campus building and an at least partially enclosed building. The present subject matter also discloses that the reliability or trustworthiness of one or more sensors, as described above, in respect to localization of the mobile device may vary depending upon various factors, including environmental factors, such as shape and size of the area in which the mobile device is located at a given point in time. In other words, a sensor may be able to provide a more reliable feedback for localization of the mobile device when used at a particular location, the particular location and its associated environmental factors having a direct bearing on the behavior of the sensor and the sensor data therefrom.

For example, if the mobile device is found to be present in a hallway or a pathway of the indoor space, the localization may be better, in terms of accuracy as well as resource consumption, when based on magnetic field measurements rather than received signal strength (RSS) measurements.

For instance, this may be owing to the behavior of the magnetic field signals in the hallways or pathways to have a uniquely identifiable pattern which can be easily correlated to fingerprints for hallways stored in a previously configured fingerprint repository. Conversely, the mobile device in open areas of the indoor space may be optimally localized when RSS measurements are used instead of magnetic field measurements. Again, this may be owing to the fact that RSS signals may have a high signal attenuation in open areas and could have a unique pattern of variation in open areas which can be easily be used against previously stored fingerprints. In said examples, fingerprint and fingerprint data may refer to time-correlated or time-stamped, individual or any combination of the sensor data of any of sensors mapped to the various locations or zones in the indoor space.

Embodiments herein provide a method of zone-based localization of a mobile device. In particular, the method may include identification of a zone of the indoor space that the mobile device is present in. The indoor space may be divided into a plurality of zones for instance, based on environmental factors as explained earlier. Further, the identification of the zone in which the mobile device is present can be achieved based on instantaneous localization information obtained from the mobile device. In another example, localization techniques, for instance, trajectory estimation techniques, may be used to identify the zone in which the mobile device is present. In the example above where the trajectory estimation techniques are used for identification of the zone, the same may be performed on the basis of an expected trajectory of the mobile device in the indoor space. Subsequently, the sensor data generated from the various sensors can be obtained and the data can be selectively used. For the purposes of selecting the sensors from which data is to be used, a localization criterion to be employed for localizing the mobile device can be determined, which in turn, can be based on the identified zone. For instance, as mentioned above, the localization criterion can be based on a per-trajectory basis or on a cumulative estimate of the localization of the mobile device. Therefore, the identified zone may be indicative of a selectivity in use of the sensor data for localizing the mobile device. For example, the localization criterion may be a weightage to be associated with the sensor data from each of the sensors for modularity in usage of the sensor data while localizing the mobile device, and may be determined for each zone, based on predetermined behavior of sensor data in each zone. For instance, in the above example, for a zone which is a pathway or a hallway, the localization criterion may be a weightage provided to magnetic field sensor data only and no weightage given to the RSS data, whereas if the zone is an open space, then the localization criterion may be a weightage provided to the RSS data only and no weightage given to the magnetic field sensor data. Accordingly, the mobile device is localized in the indoor space, based on the localization criterion. In other examples, a higher weightage may be applied to one type of sensor data, for instance, having a high reliability which has been previously determined, while a lower weightage may be assigned to previously determined less reliable another sensor data type. In other words, the sensors which are known or found to having a greater degree of reliability can have their sensor data associated with a higher weightage and vice-versa.

Also provided herein in a mobile device including a processor and a memory storing a set of computer instructions. The instructions are executable in the processor to localize the mobile device using zone-based localization as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
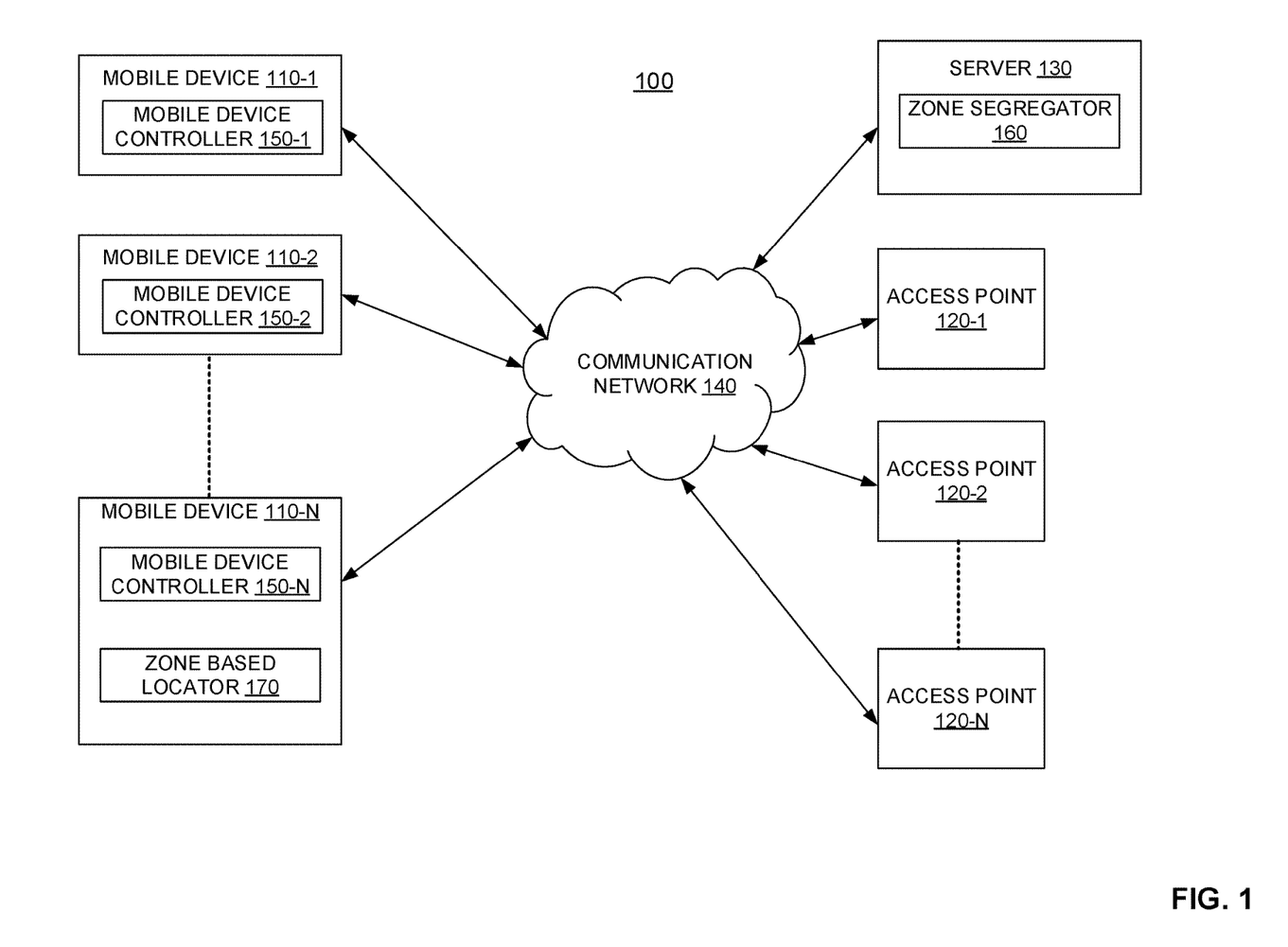
FIG. 1 illustrates, as an example, a network environment for zone-based localization of mobile devices in an indoor space.

FIG. 1 illustrates, in an example embodiment, a network environment 100 for zone-based localization of mobile devices 110-1, 110-2, . . . 110-N in an indoor space. The mobile devices 110-1, 110-2, . . . 110-N may be collectively referred to as mobile devices 110 and individually as mobile device 110. The mobile device 110, one or more access points 120-1, 120-2, . . . 120-N, collectively referred to as access points 120 in the network environment 100, and a server computing device 130 may communicate over a communication network 140.

The communication network 140, in an example, may be a wireless communication network, such as, a telecommunication network, a cellular network, a wireless local area network (WLAN), a satellite communication-based network, a near field communication-based network, etc.

The server computing device 130 may be a computing device, such as a cloud server or a remote server. The access points 120-1, 120-2, . . . 120-N, collectively referred to as access points 120 and individually referred to as access point 120, may be a computing device, which may provide for various devices to connect to a network, such as a wired network of the communication network 140. The access points 120 may be spread across the indoor space to ensure that facility appropriately covered. In another example, the mobile device 110 may directly communicate with the server computing device 130 via the communication network 140.

In one embodiment, the mobile device 110 may facilitate the accurate localization of the mobile device 110, i.e., itself, and may be a cellular or smartphone, a laptop or a tablet computer, or a wearable computer device that may be operational for any one or more of telephony, data communication, and data computing. As mentioned above, the mobile device 110 may include fingerprint data of the indoor space, such as an indoor facility and proximate pedestrian section stored in a local memory. In some examples, the mobile device 110, may download the fingerprint data from the server computing device 130, which may make the fingerprint data accessible to the mobile device 110 for download into the local memory of mobile device 110. The fingerprint data along with device data (sensor data and/or signal data) obtained by the mobile device 110 may be used for localization.

The mobile device 110 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. In another example, the server 130 may have the location determination capability and a communication interface for communicatively coupling to communication network 140. In an example, a zone-based locator 170 of the mobile device 110 may, periodically or on receiving an input from the server computing device 130, localize the mobile device 110.

The zone-based locator 170, constituted of logic instructions executable in a processor of the mobile device 110 in one embodiment, may be hosted at the mobile device 110 and provides, at least in part, capability for system localizing a mobile device along a pedestrian route traversed in an indoor area. In alternate embodiments, one or more portions constituting zone-based locator 170 may be hosted remotely at a server device and made communicatively accessible to mobile device 110 via communication network 140.

Thus, the position of the mobile device 110 may be estimated, also referred to localized, either by the mobile device 110 itself, for instance, by the zone-based locator 170; or the server 130 may implement the zone-based locator 170 to localize the mobile device 110.

In operation, the localization may be performed two phases. The first phase is referred to as a preparatory phase or a calibration phase in which the server 130 prepares for performing the zone-based localization, and the second phase is referred to as an executory phase in which the mobile device 110 performs the zone-based localization. In other examples, the preparatory phase as well as the executory phase may be performed by a single device, i.e., either the mobile device 110 or the server 130.

In the preparatory phase, a zone segregator 160 of the server 130 can segregate the indoor space into a plurality of zones. Each zone type that is identified by the zone segregator 160 is associated with a set of environmental factors that influence behavior of sensor data in that zone, which, in turn, can form the basis of the segregation. For example, the environmental factors can include a size of the zone, a shape of the zone, sensor signals available in the zone, and predicted movement patterns of the mobile device 110 in the zone.

As an example, the predicted movement pattern associated with a straight-shaped hallway can be markedly distinct and, therefore, be uniquely identifiable by a movement characterized by two straight movement paths. Once the zone segregator 160 has segregated the indoor space into the zones and their associated environmental factors, the zone segregator 160 can associate a localization criterion with each zone and the localization criterion can be indicative of a selectivity in use of the sensor data in that zone for localizing the mobile device 110, as has been explained above and will be discussed in further detail later. As an example, there may be various factors which may influence the determination of zones and their classifications. In one example, the environmental factors can be directly associated with the physical space itself, in terms of the area of the space or the convexity of a polygon space. In other examples, signals collected inside the space can be used as the environment factors. Therefore, as an example, the environmental factors can include any number of criteria, from the signal/sensor space representations to their geometric representations.

In the executory phase, as mentioned previously, the control may shift to the mobile device 110, for instance, for the purposes of performing the localization. Accordingly, the zone-based locator 170 of the mobile device 110 can perform the localization of the mobile device 110. To initiate the zone-based localization, the zone-based locator 170 can identify a zone of the indoor space that the mobile device 110 is present in. The indoor space is segregated into a plurality of zones for instance, based on environmental factors as explained earlier, for instance, in the preparatory phase.

Further, the identification of the zone in which the mobile device 110 is present can be achieved based on instantaneous localization data obtained from the mobile device 110. For instance, the instantaneous localization data can include real-time measured data that is used to form a location estimate in real-time and can involve multiple realizations or data points, including taking into account the user's history to form a trajectory to determine the current location of the mobile device of the user.

In another example, in addition or as an alternative to the instantaneous localization data, the zone-based locator 170 can use trajectory estimation techniques to identify the zone in which the mobile device 110 is present, for instance, on the basis of an expected trajectory of the mobile device 110 in the indoor space. In said example, the zone-based locator may use any of the known trajectory estimation techniques known in the art for identifying the zone in which the mobile device 110 is present.

The zone-based locator 170 can obtain the sensor data generated from the various sensors and can selectively utilize the sensor data. In an example, the selective utilization of the sensor data may mean selecting one or more of the sensors whose data is reliable and trustworthy for the purposes of localization of mobile device 110 in a given zone and then using the data in a direct combination.

In another example, as part of selective utilization, the zone-based locator 170 can employ the localization criterion, determined by the zone segregator 160 in the preparatory phase, and is indicative of the selectivity in using the sensor data for localizing the mobile device 110. For example, the localization criterion may be a weightage to be associated with the sensor data from each of the sensors depending on a reliability score associated with each of the sensors in the given zone and can allow for introducing a modularity or selectivity in usage of the sensor data while localizing the mobile device 110. In one example, the weightage associated with a certain sensor data can be "1" which means that that sensor data is to be used, whereas in another case, the weightage can be "0" meaning that that sensor data is not to be used. In the present example, a high weight, for example, close to "1" may mean that the extent to which that sensor contributes in determining the location may be high, whereas a low weightage may mean that the extent to which that sensor influences the determination of the location may be low. In said example, the reliability score can be associated with each sensor for the given zone in the calibration phase and stored in the server 130.

Accordingly, for selective utilization, the zone-based locator 170 can determine the localization criterion for each sensor in the zone and can use the cumulative result of the aggregation of the sensor data and their respective weightages or localization criterion for localizing the mobile device 110. In the end, therefore, the sensor data may be fused as per the associated weightages and then utilized for localization of the mobile device 110. For determining the position, the zone-based locator 170 may fuse the device signal data, the device sensor data, and other relevant data with the fingerprint localization data.

Figure 2:
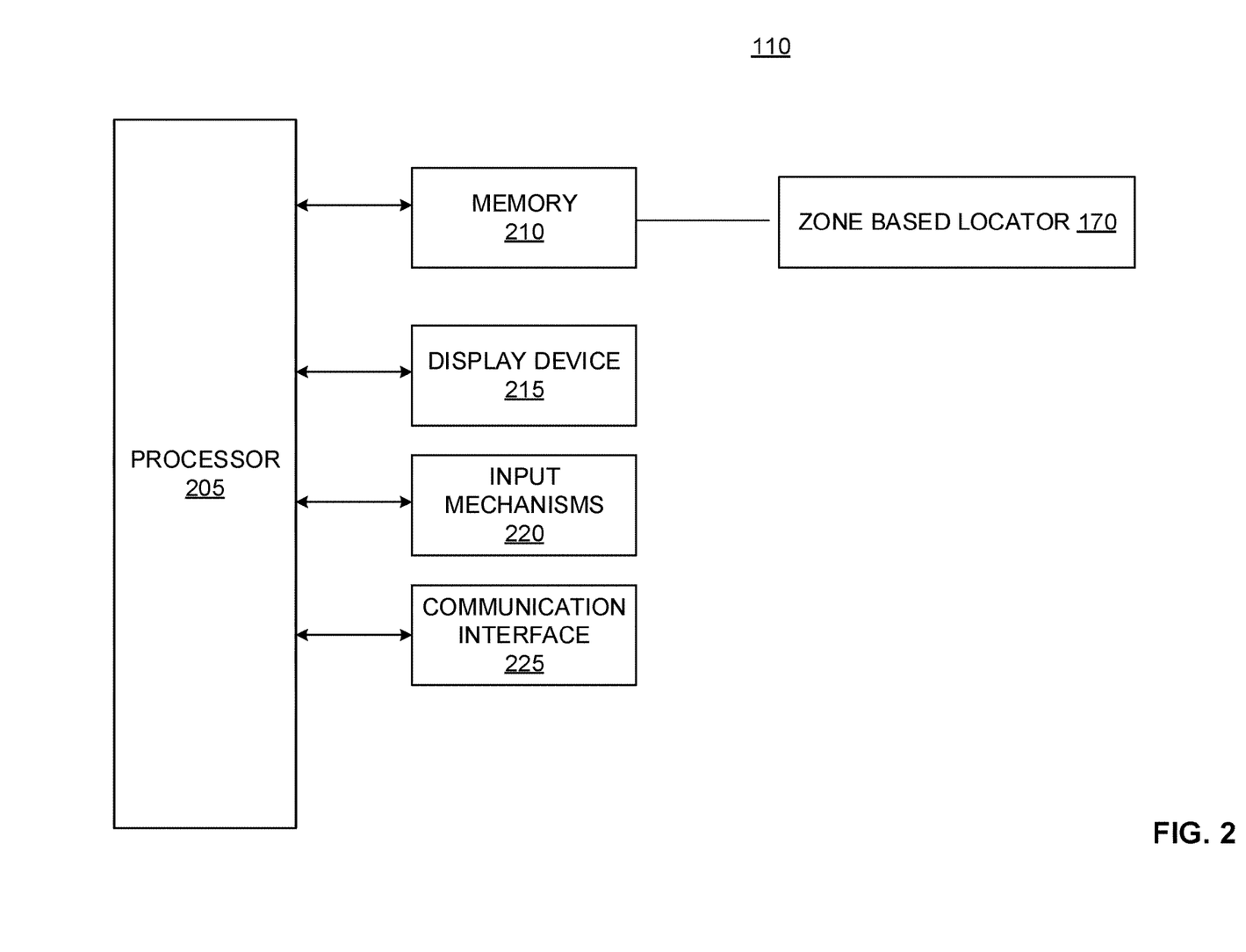
FIG. 2 illustrates, as an example, an architecture of a computer server for zone-based localization of mobile devices.

FIG. 2 illustrates an example architecture of the mobile device 110 capable of localizing itself. The mobile device 110, in an embodiment architecture, may be implemented on one or more server devices, and includes a processor 205, memory 210 which may include a read-only memory (ROM) as well as a random access memory (RAM) or other dynamic storage device, display device 215, input mechanisms 220 and communication interface 225 for communicative coupling to communication network 140. The processor 205 is configured with software and/or other logic (such as the zone segregator 160 and/or the zone-based locator 170) to perform one or more processes, steps and other functions described with implementations, such as described by FIGS. 1, 2 and 4 herein. The processor 205 may process information and instructions stored in the memory 210, such as provided by a random-access memory (RAM) or other dynamic storage device, for storing information and instructions which are executable by the processor 205. The memory 210 also may be used for storing temporary variables or other intermediate information during execution of instructions to be executed by the processor 205. The memory 210 may also include the ROM or other static storage device for storing static information and instructions for processor 205; a storage device, such as a magnetic disk or optical disk, may be provided for storing information and instructions. Communication interface 225 enables the server 130 to communicate with one or more communication networks, such as the communication network 140 (e.g., cellular network) through use of the network link (wireless or wired). Using the network link, the mobile device 130 can communicate with the server 130 and various other mobile devices 110 and other devices, such as the access point 120.

The mobile device 110, among other components, may include sensors (not shown), the zone segregator 160 and the zone-based locator 170. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. The mobile device 110 may also include capability for detecting and communicatively accessing ambient wireless communication signals including but not limited to any of Bluetooth® and Bluetooth Low Energy (BLE), Wi-Fi, RFID, or satellite-based navigations signals including global positioning system (GPS) signals. The mobile device 110 further includes the capability for detecting, via sensor devices, and measuring wireless signal parameters, which may include wireless signal parameters related to the ambient wireless signals, such as CSI related parameters, or received signal strength (RSS) or any other parameter that can be used for localization of the mobile device 110. In another example, the server 130 may have the location determination capability and a communication interface for communicatively coupling to communication network 140, In an example, a zone-based locator 170 of the mobile device 110 may, periodically or on receiving an input, localize the mobile device 110. In said example, the zone-based selector 170 can receive the inputs from the zone segregator 160 of the server 130. The zone segregator 160 and the zone-based locator 170 may include processor-executable instructions stored in RAM, in one embodiment, in the memory 210 and may include sub-modules, such as a localizer 230 and a controller 235. In an example, the mobile device 110 may also be communicatively coupled to a fingerprint data repository (not shown in figures), which may reside at or be communicatively coupled to the server 130, via the communication network 140. In alternate embodiments, the fingerprint data repository, or any portion(s) thereof, may be stored in a memory of mobile device 110.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of mobile device 102 for use in conjunction with the pedestrian navigation software application executing thereon.

In an example, a fingerprint data repository, or any portion(s) thereof, may be stored in remote computing server device (not shown), and made communicatively accessible to mobile device 110 via communication network 140. In some embodiments, it is contemplated that the fingerprint data repository, or any portions of data and processor-executable instructions constituting the fingerprint data repository, may be downloaded for storage, at least temporarily, within a memory of mobile device 102. In embodiments, the fingerprint map data stored in the fingerprint data repository further associates particular positions along pedestrian route of the facility or indoor area with any combination of fingerprint data, including gyroscope data, accelerometer data, wireless signal strength data, wireless connectivity data, magnetic data, barometric data, acoustic data, line-of sight data, and ambient lighting data stored thereon.

In said example embodiments, the sensor data can include mobile device wireless signal data including signal strength and connectivity, inertial data, barometric data, magnetic data and other device data may be gathered at positions along a trajectory of motion and Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data, which may all be used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. Accordingly, in an example, the sensor data may include a first set of sensor data signals acquired by the mobile device 110 and a second set of sensor data generated by the mobile device 110. For instance, the data from the inertial sensors can be the sensor data generated by the mobile device 110 and the part of the data from the signal sensors can be the sensor data acquired by the mobile device 110 while part of the signal data may be generated by the mobile device 110 itself.

As explained above, the mobile device 110 can perform its own optimal indoor localization, by curating sensor data which is matched with the characteristics of the location of the indoor space in which the localization is to be performed, i.e., the zone in which the mobile device 110 is instantaneously present.

In operation, explained above, there may be two phases of operation—the preparatory phase and the executory phase. As an example, in the preparatory phase, the server 130 may operate and prepare for performing the zone-based localization, and the mobile device 110 may operate in the executory phase in which the mobile device 110 performs the zone-based localization.

As explained earlier, as an example, the preparatory phase may be performed outside the mobile device 110 by the zone segregator 160 of the server 130 as part of calibration. In said embodiment, few pre-calculations can be performed on the server side and stored into efficient data structures, either at the server 130 or the mobile device, so that a minimalistic set of data is created which is readily available when needed by the mobile device, whether obtained from the server 130 or stored locally, to determine its own position in real-time. In few other embodiments still, the server 130 can initialize the zone-based localization operation at its end and all the processing for localization can be performed entirely at the server 130.

In the prepartory phase, the zone segregator 160 can segregate the indoor space into a plurality of zones. For instance, in case the indoor space is a pedestrian area, such as a shopping mall, the zone segregator 160 may identify multiple distinct zones. In an example, the zone segregator 160 may identify three distinct zones, namely, narrow hallways, open areas, and floor openings. As an example, narrow hallways can be pathways connecting the open areas and the floor openings, whereas the floor opening can be a portion of the indoor space where the mobile device 110 may be able to change elevation and move to different floors of the shopping mall. Each zone that is identified by the zone segregator 160 is associated with a set of environmental factors that influence behavior of sensor data in that zone, which, in turn, can form the basis of the segregation. For example, the environmental factors can include a size of the zone, a shape of the zone, sensor signals available in the zone, and predicted movement patterns of the mobile device 110 in the zone. In said example, the shape of the zone may include open areas, narrow pathways, or floor openings, in case the indoor space is a pedestrian area, such as a shopping mall. Further, the availability of sensor signal may include whether GPS signal is available in the zone or not, the RSS signal density in the zone, whether the zone involves elevation changes, and availability of high-quality magnetic field signals in the zone. As an example, the predicted movement pattern associated with straight-shaped hallway can be a markedly distinct and, therefore, uniquely identifiable movement characterized by two straight movement paths. In another example, the predicted movement can include restriction of movement due to narrow walking paths, one-way movement along walkways, no restriction on movement or random zig-zag movements.

Once the zone segregator 160 has segregated the indoor space into the zones and their associated environmental factors, the zone segregator 160 can associate a localization criterion with each zone and the localization criterion can be indicative of a selectivity in use of the sensor data in that zone for localizing the mobile device 110.

Further, in one example, the zone segregator 160 can create a fingerprint map of the indoor space which can be used as a reference for zone-based localization. In an example, the fingerprint map may or may not be directly related to the zones, and may represent the overall spread of data within the venue or the indoor space as a combination of location and signal or sensor data. In general, the fingerprint map may be used to calculate probabilities of where the user might be and such probabilities can be used to form location estimates. Based on the location estimates, the location of the mobile device can be determined.

In a simplified example, for forming the fingerprint map, the zone segregator 160 can obtain sensor data from the various sensors in the various locations across the indoor space and can separate and categorize the sensor data based on a source, i.e., the sensor, from which the sensor data is received. The zone segregator 160 may determine the variation pattern of the sensor data across different locations and zones of the indoor space and stitch the same together using machine learning techniques to generate a fingerprint map for that sensor. Similarly, the zone segregator 160 may generate the fingerprint map for all the sensors in the indoor space that cooperate with the mobile device 110 or are part of the mobile device 110, i.e., are source of sensor data for the mobile device 110. As evident, the fingerprint map indicates varying behavior of sensor data in different zones and locations of the indoor space. The fingerprint map generation by the zone segregator 160 can be performed by one or more techniques known in the art and are not reproduced here for the sake of brevity.

In the executory phase, the zone-based locator 170 of the mobile device 110 can perform the localization of the mobile device 110. In one example, to initiate the zone-based localization, the zone-based locator 170 can determine whether the mobile device 110 is in an indoor space in which the mobile device 110 is to be localized. In said example, the mobile device 110 may constantly or continually communicate with the server to transmit information regarding the location, for example, based on a Global Positioning System (GPS) application on the mobile device 110 and the mobile device 110 may switch modes from using the GPS application to disabling the GPS application based on, for instance, accuracy and location of the mobile device based on the GPS signal, indicating that the mobile device 110 is in an indoor space. In addition, the immediately preceding location of the mobile device 110 may also be used to determine the presence of the mobile device 110 in an indoor space. In another example, the initialization of the localization of the mobile device 110 within the indoor space can be done manually, for example, by activating the mobile device 110 to perform localization in the indoor space, in which case the assessment as to whether the mobile device 110 is within the indoor space or not may not have to be performed separately.

In either of the cases above, once the mobile device 110 is initialized for localization, it may trigger the localization operation at the mobile device 110.

As mentioned previously, the indoor space is segregated into a plurality of zones explained earlier, for instance, as in the preparatory phase and the zone-based locator 170 can identify the zone of the indoor space that the mobile device 110 is present in. Before the zone-based localization, a preliminary estimation of the position of the mobile device may be performed and, once the preliminary estimation is done, the selection of the data sources for the purpose of localization can be done based on the preliminary localization and the corresponding zone. According to an aspect, the present subject matter can allow for collaborating with or employing existing techniques in combination with the techniques disclosed above as part of the present subject matter to perform the preliminary localization or estimation of position of the mobile device. The preliminary localization is a term used for identification of the zone in which the mobile device 110 is present before zone-based localization. In one example, the preliminary localization can be performed as an initial step when the mobile device 110 enters the indoor space, and subsequently, the historical localization or position estimation or trajectory can be used for determining the instantaneous position of the mobile device 110 for the purposes of localization using the embodiments of the present disclosure.

In an example, the zone-based locator 170 is to perform the preliminary localization based on instantaneous localization data obtained, for instance, from the various sensors of the mobile device 110. The localization data, among other things, may include location details, such as location coordinates (x, y) in the indoor space, floor number information, such as for a multi-floor building constituting the indoor space, or any other device data (signal and/or sensor) used for localization. Further, the localization data may also include a confidence level associated with the estimated location of the mobile device 110.

In another example, the present subject matter may use trajectory estimates for preliminarily localizing the mobile device prior to be able to perform zone-based localization of the mobile device 106. In other words, the zone-based locator 170 can use determine an expected trajectory of the mobile device 110 in the indoor space to perform the preliminary localization. In said example, the zone-based locator 170 may use any of the known trajectory estimation techniques known in the art for identifying the zone in which the mobile device 110 is present.

The zone-based locator 170 can obtain the sensor data generated from the various sensors and can selectively utilize the sensor data. In an example, the selective utilization of the sensor data may mean selecting one or more of the sensors whose data is reliable and trustworthy for the purposes of localization of mobile device 110 in a given zone and employing a straight combination thereof. For example, if the preliminary localization of the mobile device 110 determines that the mobile device is positioned in a narrow pathway, then the data signals from the magnetic field signal sources can be selected for the data signals for localization. On the other hand, if the preliminary localization indicates that the mobile device is located at a floor opening, then the combination of digital fingerprints of RSS sources, gyroscopic signal sources, and accelerometer signal sources can be used for localizing the mobile device.

In another example, as part of selective utilization, the zone-based locator 170 can employ the localization criterion, determined by the zone segregator 160 in the preparatory phase, and is indicative of the selectivity in using the sensor data for localizing the mobile device 110. For example, the localization criterion may be a weightage to be associated with the sensor data from each of the sensors for introducing a modularity in usage of the sensor data while localizing the mobile device 110. Accordingly, for selective utilization, the zone-based locator 170 can determine the localization criterion for each sensor in the zone and can use the cumulative result of the aggregation of the sensor data and their respective weightages or localization criterion for localizing the mobile device 110. As an example, the weightages associated with the sensor data can be based on the reliability score linked to that sensor in the identified zone. The reliability score, in turn, can be associated with each sensor for a given zone at the time of calibration, for instance, by the server 130 and can be stored therein for use by the zone-based locator 170 for localization.

The employment of localization criterion by the zone-based locator 170 for the purposes of selectivity in utilization of the sensors or their data is explained with reference to the following example. However, the example is for the purposes of illustration only and should not be construed as a limitation in any manner. In an indoor space which is a pedestrian area, such as a shopping mall or a gaming arcade, the indoor space may be made of a number of areas which can be segregated into three distinct zones connected to each other. The three zones may include narrow hallways, open areas where the hallways cross, and floor openings where the floors can be changed.

In such a case, if the zone that the mobile device 110 is identified to be in is a narrow passageway or a narrow hallway, magnetic field sensors sources may be a reliable source of sensor data signals. The direction and intensity of the magnetic field signal at a given location may be influenced easily by existence of other magnetic fields, but if the magnetic field signal data is obtained from the mobile device 110 as the device moves over a short distance, for instance, 10 to 15 meters, then the variation sequence or the variation pattern of the magnetic field data signal can be used as a unique pattern for the mobile device 110 in that region of movement. In addition, the magnetic field data signals can be sensitive to slight movements of the mobile device 110 and, for that reason also, are apt for use in hallways or pathways where the pattern of movement of the mobile device 110 is markedly distinct and, therefore, uniquely identifiable, for example, where the movement is characterized by a data signal that indicates two straight movement paths. In open areas of the indoor spaces, the movement of the mobile device 110 may have no pattern and, therefore, a unique pattern may not be derivable from the magnetic field data signals. Therefore, patterns generated due to magnetic field signal sources can be unique and can be used for identifying, for example, hallways, because of the uniqueness over a distance that the mobile device 110 moves in a given direction.

In such an area the RSS signals may be valid but not be as reliable as and, accordingly, may not be able to contribute as much as the magnetic field sensor data. Therefore, for such a zone, the localization criterion may be a combination of the magnetic field sensor input as well as the RSS data, with greater weightage to the magnetic field sensor data and lesser weightage to the RSS data. For instance, the localization criterion may have 0.8 or 80% weightage to the magnetic field sensor data whereas 0.2 or 20% weightage to the RSS. In other words, the reliability score associated with the RSS data is found to be higher than the reliability score associated with the magnetic field sensor data in the given zone, i.e., in the narrow passageway. The above allocation of weightages may also indicate that though less reliable and, thus having a low reliability score, the RSS data can still contribute in accurately localizing the mobile device 110 in the zone made up of narrow hallways.

Conversely, RSS signals, as an indicator, behaves differently from magnetic field data signals in open areas and hallways. In case the identified zone for the mobile device 110 being present therein is an open area, the RSS signals may have a high signal attenuation in such a zone and could be unique for generating the digital pattern for open areas. Therefore, the RSS data source may serve as a more reliable data source for open areas as the pattern formed by the RSS signals can be uniquely identified in open areas. The magnetic field signal sources may not be apt for identifying an open space, such as a lobby, because the pattern of movement of the device is not defined. Therefore, in such a case, for example, the localization criterion may have 0.9 or 90% weightage to the RSS data and only 0.1 or 10% weightage to the RSS. This may also indicate that the magnetic field sensor data has little bearing on localization, but may still add to the accuracy in localizing the mobile device 110 in the zone made up of open areas.

In other embodiments, the selective utilization of the sensor data can include that the data from all the sensors is selected for being used in localization. However, the weightage associated with each sensor data may vary depending on the contribution that a particular sensor may be able to make in determining the location of the mobile device 110 at a given position.

Once the localization criterion has been determined, the zone-based locator 170 can perform the localization of the mobile device 110. In an example, to perform localization, the zone-based locator 170 can use the localization data as well the sensor data, for instance, fused in consonance with the localization criterion to localize the mobile device 110 in the indoor space. In case the localization data includes the location coordination, the zone-based locator 170 may identify the location coordinates as an estimated position of the mobile device 110. For instance, once a particular as-measured value, a pattern or signature based on any one or more of received wireless communication signal strength and signal connectivity parameters, magnetic field parameters or barometric pressure parameters, and mobile device inertial sensor data is detected or recorded by the mobile device 110, the value or pattern as detected may be matched to a reference fingerprint stored in a fingerprint map of a given indoor space, for example, as stored in positioning fingerprint data repository, to identify the unique position of the mobile device 110 relative to the indoor space for localization. In one case, the zone-based locator 170 can generate a signal signature for one or more of the sensors based on the sensor data received therefrom, which is indicative of behavior of the sensor data in the identified zone and can be used for localization as explained herein.

In an example, as a measure of the accuracy of localization of mobile device 110, the confidence level associated with the location estimate may be obtained by fusing the probabilistic results of multiple concurrent location estimates. In some embodiments, the variance in the x and y components, with respect to their mean values ($\mu x$, $\mu y$), can be estimated independently as:

$$\sigma_x^2 = \frac{1}{N-1}\Sigma(x-\mu_x)^2$$

$$\sigma_y^2 = \frac{1}{N-1}\sum(y-\mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position may also have a probabilistic estimate expressed as a confidence level.

Methodology

Figure 3:
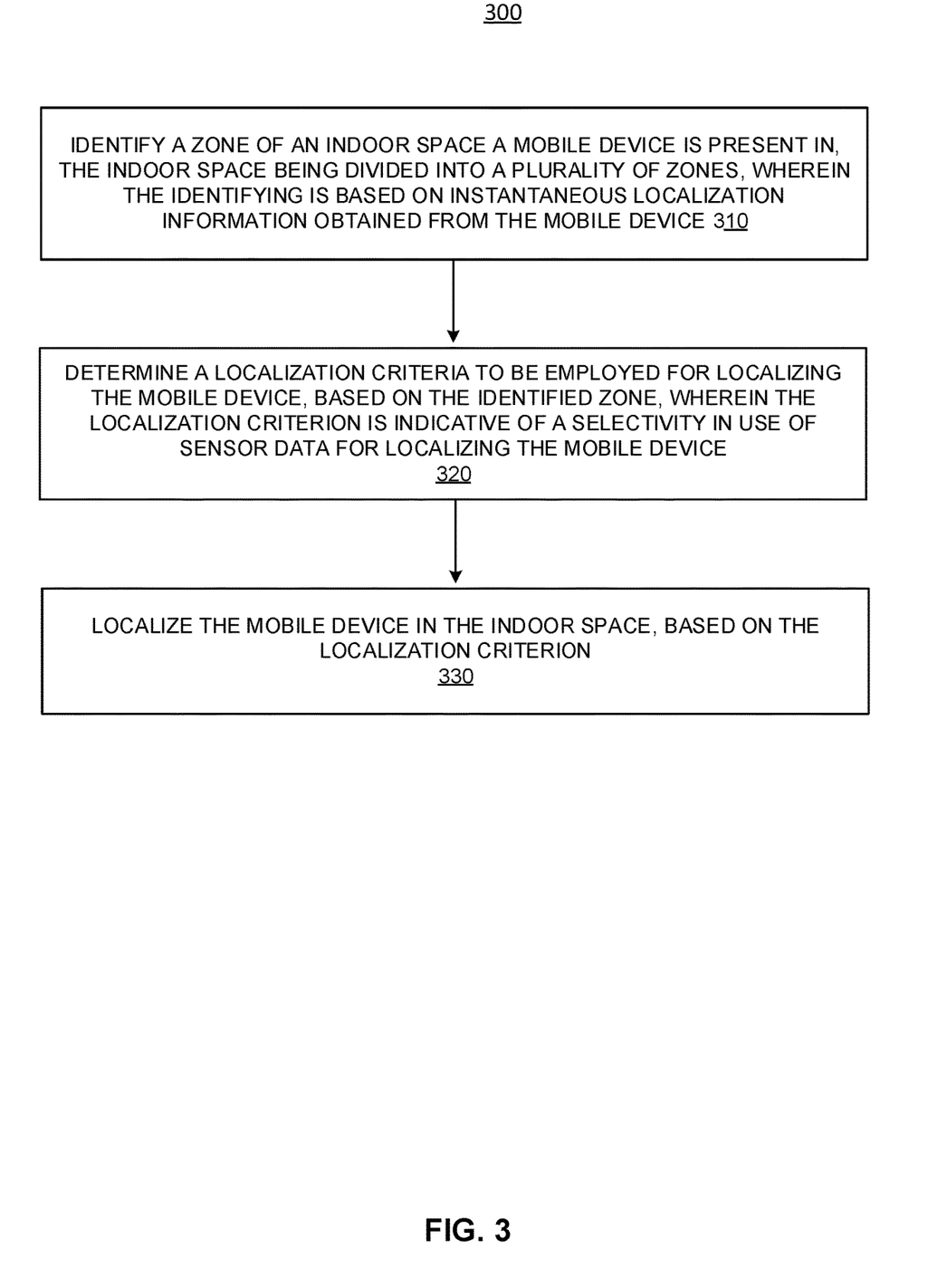
FIG. 3 illustrates, as an example, a method of zone-based localization of mobile devices.

FIG. 3 illustrates, as an example, a method 300 of localizing a mobile device in an indoor space. In describing examples of FIG. 3, reference is made to the examples of FIGS. 1-2 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 3 examples of method steps described herein are related to a mobile device, such as the mobile device 110, to facilitate accurate localization of thereof. According to one embodiment, the techniques are performed by the processor 205 executing one or more sequences of software logic instructions that constitute the zone-based locator 170 of the mobile device 110. In embodiments, the zone-based locator 170 may include the one or more sequences of instructions within sub-modules. Such instructions may be read into the memory 210 from machine-readable medium, such as memory storage devices. Execution of the sequences of instructions contained in the zone-based locator 170 in the memory 210 causes the processor 205 to perform the process steps described herein. It is contemplated that, in some implementations, some of the sub-modules, or any other portions of executable instructions constituting the zone-based locator 170 may be hosted at a remote device other than the mobile device 110 or at the server 130. In alternative implementations, at least some hard-wired circuitry may be used in place of, or in combination with, the software logic instructions to implement examples described herein. Thus, the examples described herein are not limited to any particular combination of hardware circuitry and software instructions.

At block 310, a zone of the indoor space that the mobile device 110 is present in is identified. The indoor space may be divided into a plurality of zones for instance, based on environmental factors as explained earlier. Further, the identification of the zone in which the mobile device 110 is present can be achieved based on instantaneous localization information obtained from the mobile device 110. In another example, in addition to the instantaneous localization information, trajectory estimation techniques may be used to identify the zone in which the mobile device 110 is present, for instance, on the basis of an expected trajectory of the mobile device 110 in the indoor space.

At block 320, a localization criterion to be employed for localizing the mobile device 110 can be determined based on the identified zone and may be indicative of a selectivity in use of the sensor data for localizing the mobile device 110. For example, the localization criterion may be a weightage to be associated with the sensor data from each of the sensors for modularity in usage of the sensor data while localizing the mobile device 110, and may be determined for each zone, based on predetermined behavior of sensor data in each zone.

For instance, if the zone is a pathway or a hallway, the magnetic field data is a strong and reliable source for indicating the position and may play a significant role in comparison to RSS measurements in localization of the mobile device 110. Additionally, when the zone is the hallway, the predicted motion of the mobile device 110 is likely to be along the length of the hallway and movement across the hallway is less likely, thereby making the magnetic field data a considerable contributor in localization of the mobile device 110. In said example, if the zone is a small area, for instance, a lobby or a seating or resting area, in such areas magnetic field measurements are less valuable than they are in hallways and will have less contribution towards localization in relation to the RSS measurements. Additionally, the predicted motion of the mobile device 110 in such areas will be from one connected hallway to another as the mobile device 110 may not stagnate in the small areas. If the zone is a large open area, such as a floor opening, the magnetic measurements have negligible value for localization and the positioning may be driven primarily by RSS measurements. Unlike the other zones, the predicted motion of the mobile device 110 may not follow any particular pattern, rather the motion of the mobile device 110 may be predicted to be in all directions, including in the center of the zone.

Therefore, the localization criterion in the first case above may be a weightage of 1 or 100% provided to magnetic field sensor data only and no weightage given to the RSS data, whereas in the third case, a weightage of 1 or 100% may be provided to the RSS data only and no weightage given to the magnetic field sensor data. In the second case above, the localization criterion may include a weightage of 0.75 or 75% to the RSS measurement and a weightage of 0.25 or 25% to the magnetic field sensor measurement.

Subsequently at block 330, the mobile device 110 is localized in the indoor space, based on the localization criterion.

Figure 4:
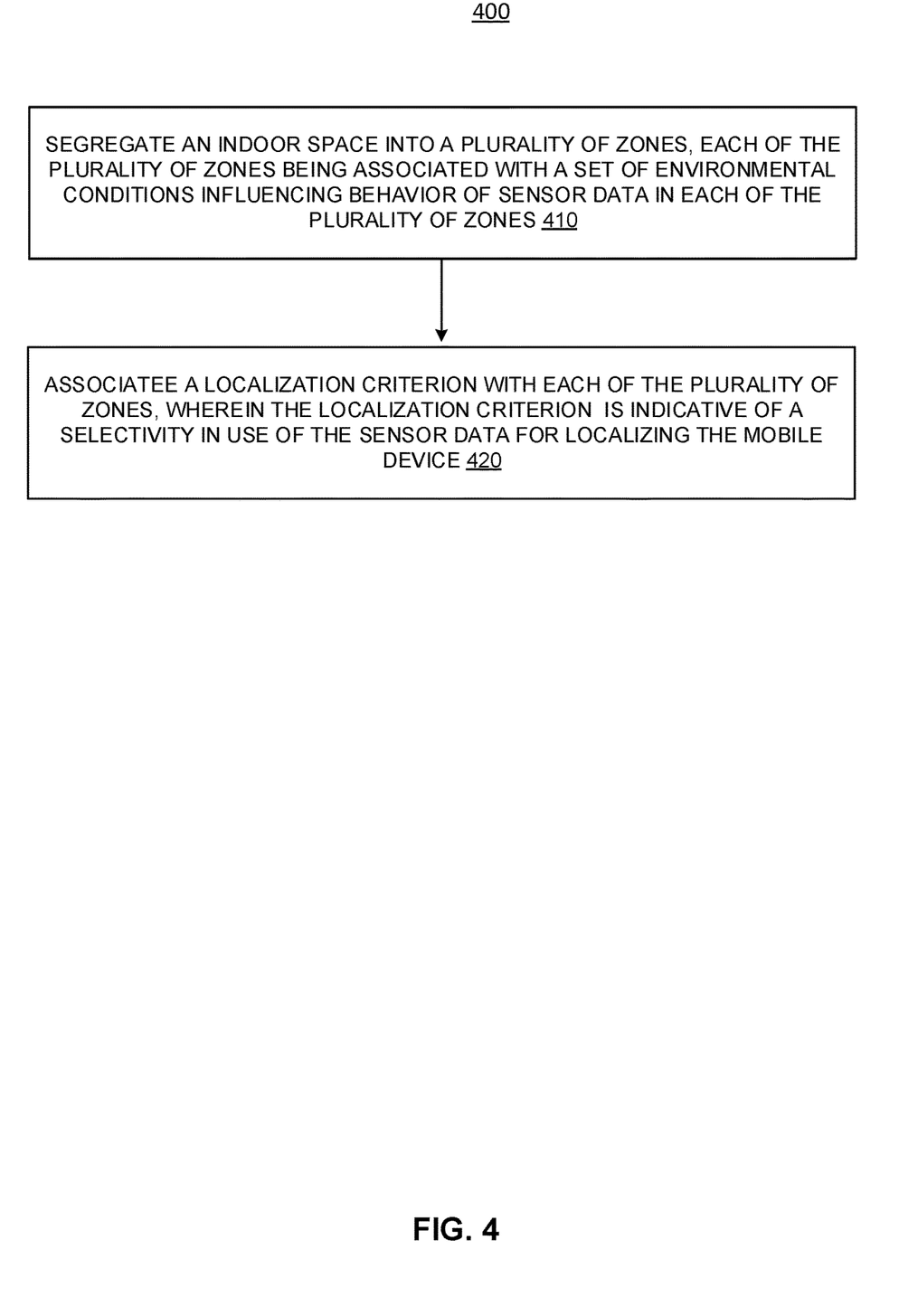
FIG. 4 illustrates, as an example, a method of calibration for zone-based localization of mobile devices.

FIG. 4 illustrates, as an example, a method of calibration for zone-based localization of mobile devices. In describing examples of FIG. 4, reference is made again to the examples of FIGS. 1-2 for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4 examples of method steps described herein are techniques are performed by the processor 205 executing one or more sequences of software logic instructions that constitute the zone segregator 160 of the server 130. In embodiments, the zone segregator 160 may include the one or more sequences of instructions within sub-modules. Such instructions may be read into the memory 210 from machine-readable medium, such as memory storage devices. Execution of the sequences of instructions contained in the zone segregator 160 in the memory 210 causes the processor 205 to perform the process steps described herein. It is contemplated that, in some implementations, some of the sub-modules, or any other portions of executable instructions constituting the zone segregator 160 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

At block 410, the indoor space can be segregated into a plurality of zones. For instance, in case the indoor space is a pedestrian area, such as a shopping mall or an airport, can identify three distinct zones, namely, narrow hallways, open areas, and floor openings. Each zone that is identified is associated with a set of environmental factors that influence behavior of sensor data in that zone, which, in turn, can form the basis of the segregation. For example, the environmental factors can include size of the zone, shape of the zone, sensor signals available in the zone, and predicted movement patterns of the mobile device 110 in the zone.

Once the indoor space is segregated into the zones and their associated environmental factors, at block 420 a localization criterion can be associated with each zone and the localization criterion can be indicative of a selectivity in use of the sensor data in that zone for localizing the mobile device 110. As explained above, in an example, the localization criteria can include a weightage to be associated with the sensor data, which in turn can be based on the reliability score associated with the sensor data in each of the various zones that have been identified. Therefore, in said example, as part of associating, the weightage can be assigned with the sensor data from each of the various sensors, based on a reliability score linked with the sensor data for each identified zone.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method comprising:
   identifying a zone of an indoor space a mobile device is present in, the indoor space being divided into a plurality of zones, wherein the identifying is based on instantaneous localization information obtained from the mobile device;
   determining a localization criterion, from among a plurality of localization criterion, to be employed for localizing the mobile device, based on the identified zone,
   wherein each localization criterion, from the plurality of localization criterion, is defined for a corresponding zone in the plurality of zones, based on predetermined behavior of sensor data in each of the plurality of zones of the indoor space; and
   wherein the localization criterion is indicative of a weightage of the sensor data for localizing the mobile device; and
   localizing the mobile device within the zone, based on the localization criterion.

2. The method of claim 1, wherein the localizing comprises generating a signal signature for at least one of a plurality of sensors based on the sensor data received therefrom, wherein the signal signature is indicative of behavior of the sensor data in the identified zone.

3. The method of claim 1, wherein the localization criterion comprises the weightage to be associated with the sensor data from each of a plurality of sensors of the mobile device for modularity in usage of the sensor data for localizing the mobile device.

4. The method of claim 1, wherein the identifying comprises performing a preliminary localization of the mobile device, wherein the preliminary localization is based on trajectory estimation techniques configured to identify the zone based on an expected trajectory of the mobile device in the indoor space.

5. The method of claim 1, wherein the plurality of sensors comprises inertial sensors and signal sensors.

6. A method of calibrating an indoor space for localizing a mobile device, the method comprising:
   segregating the indoor space into a plurality of zones, each of the plurality of zones being associated with a set of environmental factors influencing a behavior of sensor data in each of the plurality of zones; and
   associating a localization criterion with each of the plurality of zones, wherein the localization criterion is indicative of a selectivity in use weightage of the sensor data for localizing the mobile device.

7. The method of claim 6, wherein the set of environmental factors comprise at least one of a size of a zone, a shape of a zone, sensor signals available in the zone, and predicted movement patterns of the mobile device in the zone.

8. The method of claim 6, wherein the segregating comprises dividing the indoor space into a pathway, an open area, and a floor opening, the indoor space being a pedestrian area.

9. The method of claim 6, wherein the associating comprises assigning the weightage with the sensor data from each of a plurality of sensors, based on a reliability score linked with the sensor data for each of the plurality of zones.

10. A device comprising:
    a processor; and
    a memory storing a set of instructions, the instructions executable in the processor to:
    identify a zone of an indoor space a mobile device is present in, the indoor space being divided into a plurality of zones, wherein the identifying is based on instantaneous localization information obtained from the mobile device;
    determine a localization criterion, from among a plurality of localization criterion, to be employed for localizing the mobile device, based on the identified zone,
    wherein each localization criterion, from the plurality of localization criterion, is defined for a corresponding zone in the plurality of zones, based on predetermined behavior of sensor data in each of the plurality of zones of the indoor space; and wherein the localization criterion is indicative of a weightage of the sensor data for localizing the mobile device; and localize the mobile device within the zone, based on the localization criterion.

11. The device of claim 10 further comprising instructions executable in the processor to generate a signal signature for at least one of the plurality of sensors based on the sensor data received therefrom, wherein the signal signature is indicative of behavior of the sensor data in the identified zone.

12. The device of claim 10, wherein the localization criterion comprises the weightage to be associated with the sensor data from each the plurality of sensors for modularity in usage of the sensor data for localizing the mobile device.

13. The device of claim 10, further comprising instructions executable in the processor to perform a preliminary localization of the mobile device based on trajectory estimation techniques configured to identify the zone based on an expected trajectory of the mobile device in the indoor space.

14. The device of claim 10, wherein the plurality of sensors comprises inertial sensors and signal sensors.

15. The device of claim 10 further comprising instructions executable in the processor to determine presence of the mobile device in the indoor space.

16. The device of claim 10 further comprising instructions executable in the processor to:

segregate the indoor space into the plurality of zones, each of the plurality of zones being associated with a set of environmental factors influencing a behavior of the sensor data in each of the plurality of zones; and associate the localization criterion with each of the plurality of zones, wherein the localization criterion is indicative of a selectivity in use of the sensor data for localizing the mobile device.

17. The device of claim 16, wherein the set of environmental factors comprise at least one of a size of a zone, a shape of a zone, sensor signals available in the zone, and predicted movement patterns of the mobile device in the zone.

18. The device of claim 16, further comprising instructions executable in the processor to divide the indoor space into a pathway, an open area, and a floor opening, the indoor space being a pedestrian area.

* * * * *